UNITED STATES PATENT OFFICE.

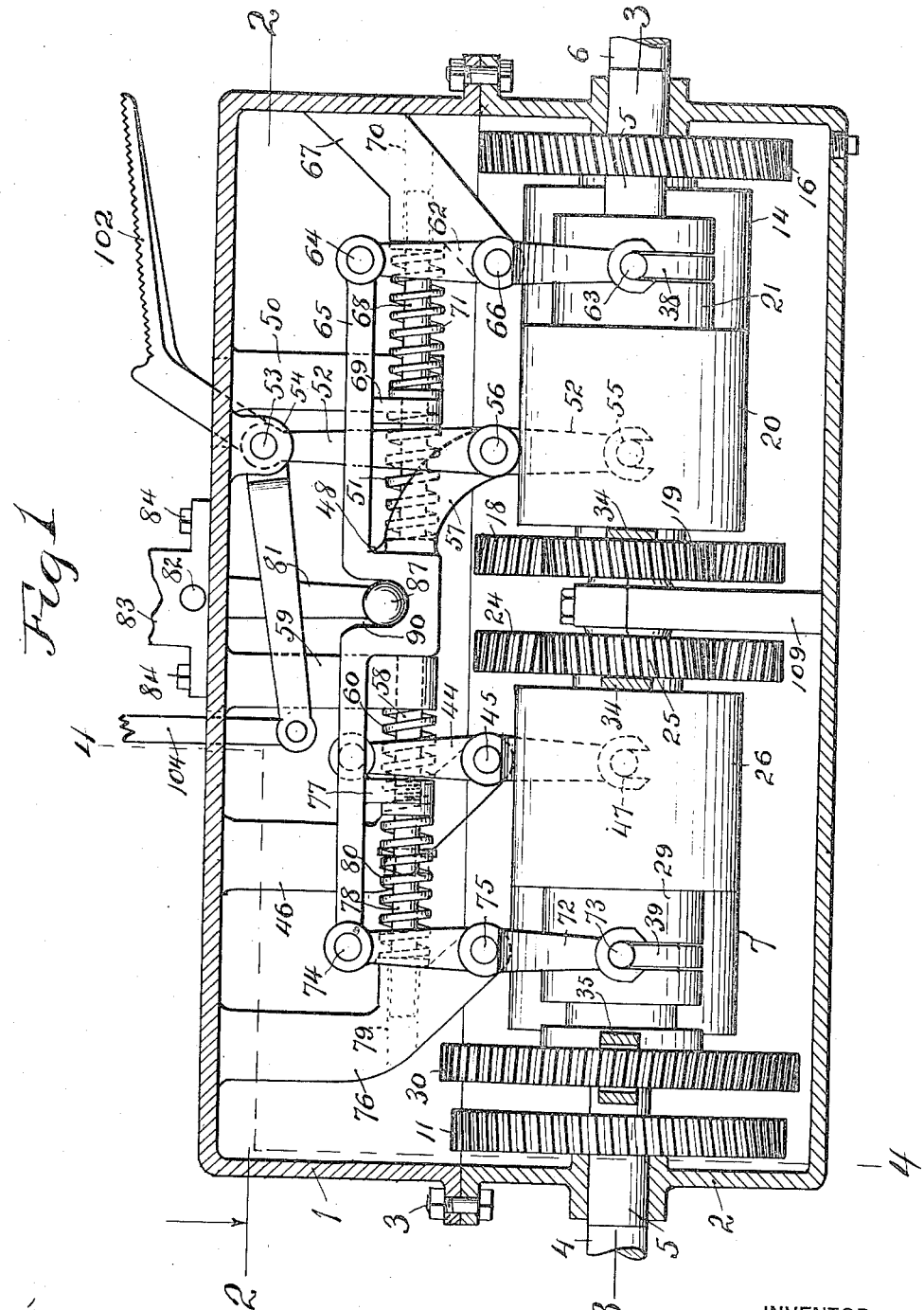

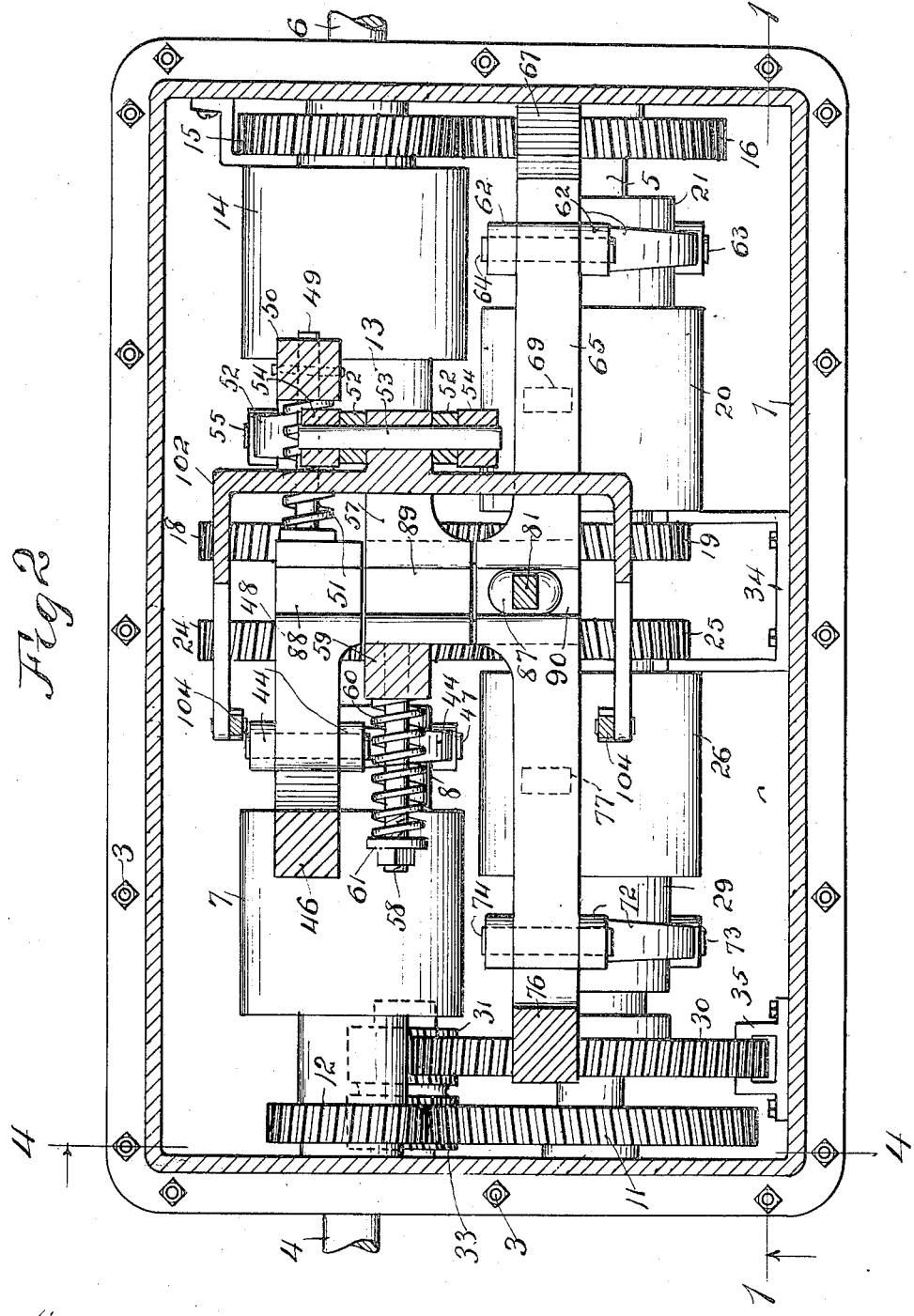

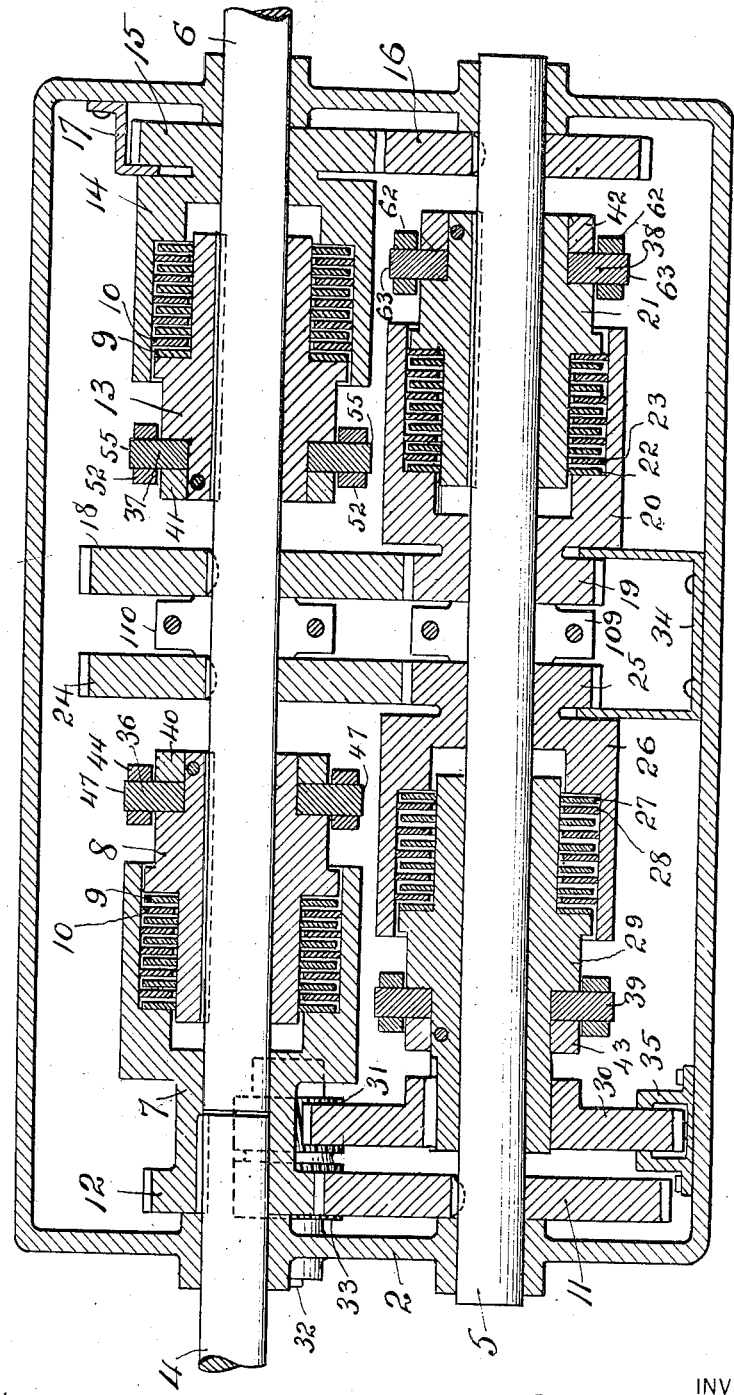

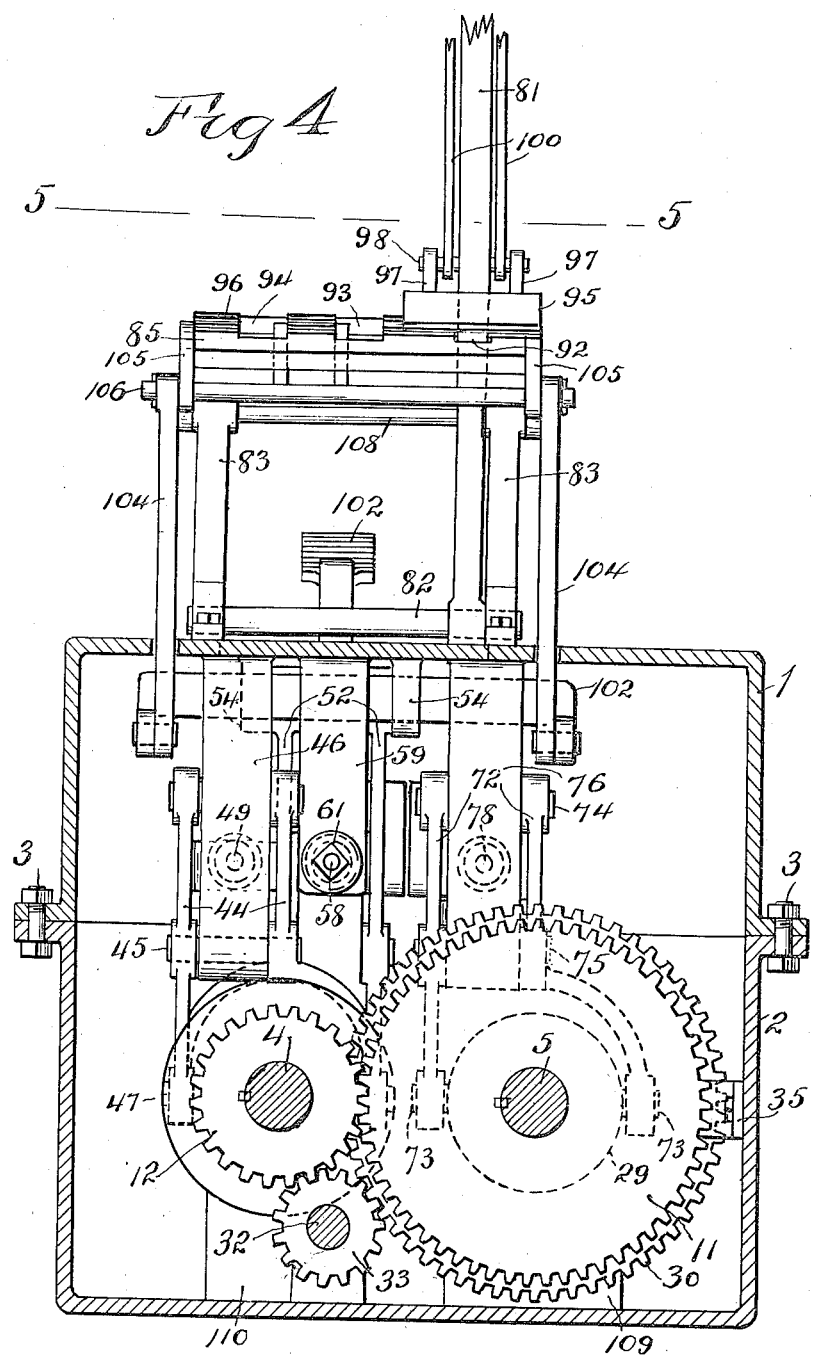

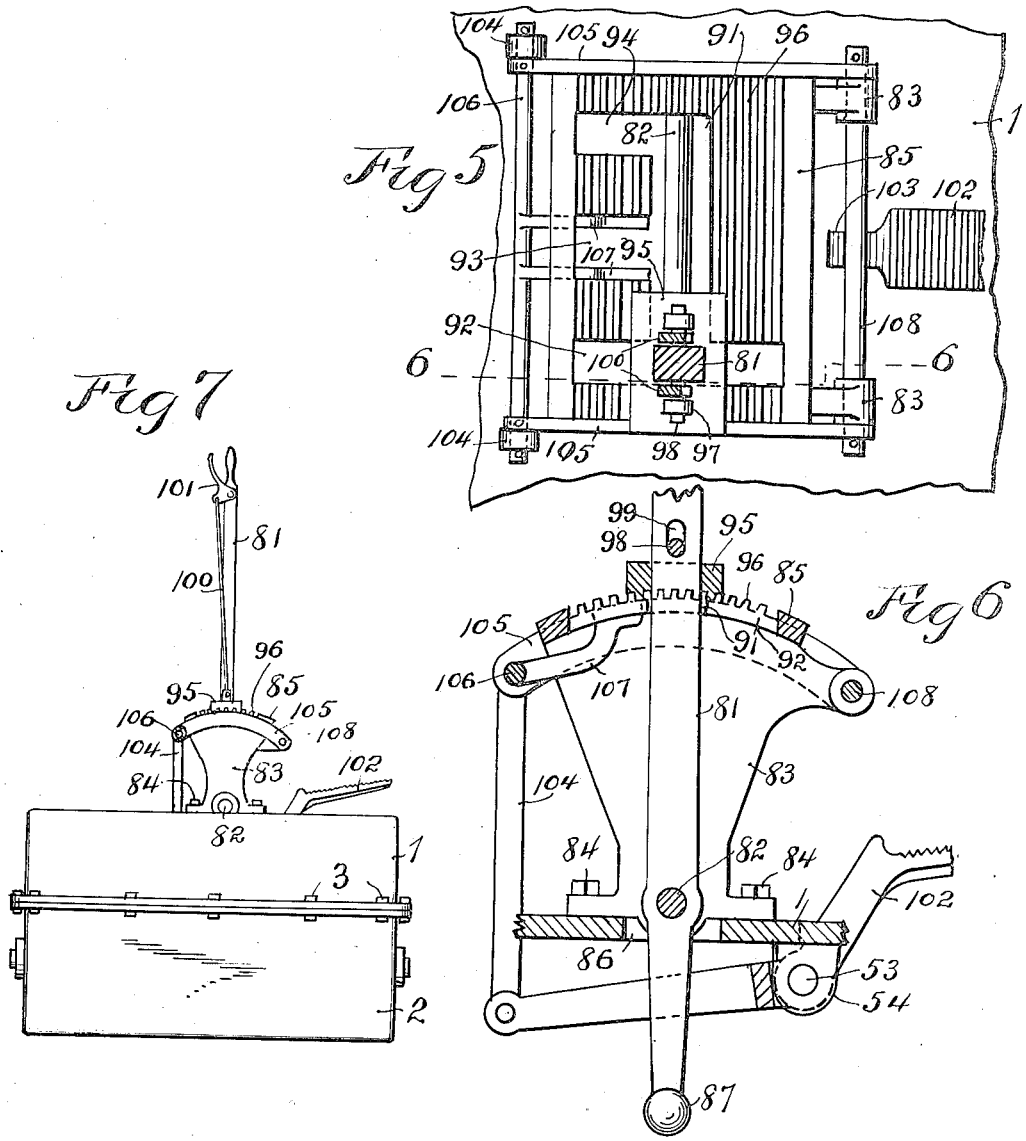

SWENEY MUNSON, OF FOWLER, COLORADO.

CHANGE-SPEED TRANSMISSION.

1,316,633.   Specification of Letters Patent.   Patented Sept. 23, 1919.

Application filed February 13, 1919. Serial No. 276,699.

*To all whom it may concern:*

Be it known that I, SWENEY MUNSON, a citizen of the United States, residing at Fowler, in the county of Otero and State of Colorado, have invented a certain new and useful Improvement in Change - Speed Transmissions, of which the following is a specification.

My invention relates to improvements in change speed transmission. It is particularly well adapted for use in automobiles.

One of the objects of my invention is to provide a change speed transmission which is simple in construction, reliable in operation, cheaply manufactured, not liable to get out of order, which is durable, and which may be readily applied to the driving mechanism of automobiles now on the market.

A further object of my invention is to provide a change speed transmission adapted for three different speeds and for reversing, and provided with an operating member which is always moved in one direction for the three speeds ahead and in the opposite direction for reversing. By means of this mechanism, the operator of the machine always moves the operating member, preferably a lever, in the direction the car is to be driven, irrespective of the speed, thereby avoiding liability of confusion in an emergency.

Still another object of my invention is the provision of a novel change speed transmission in which the gearing which connects the driving shaft with the driven or jack shaft is always in mesh, combined with lever actuated individual clutches for effecting change in speed and reversing while leaving the gearing in mesh.

The novel features of my invention are hereinafter fully described and claimed.

In the accompanying drawings, which illustrate the preferred embodiment of my invention.
Figure 1 is a vertical sectional view on the line 1—1 of Fig. 2, of a portion of my improvement.

Fig. 2 is a horizontal sectional view on the line 2—2 of Fig. 1.
Fig. 3 is a horizontal sectional view on the line 3—3 of Fig. 1.

Fig. 4 is a vertical sectional view on the broken line 4—4 of Fig. 1.

Fig. 5 is a fragmental top view on the line 5—5 of Fig. 4.

Fig. 6 is a vertical sectional view on the line 6—6 of Fig. 5.

Fig. 7 is a reduced side elevation of the casing and parts supported thereby.

Similar reference characters designate similar parts in the different views.

The casing which supports the mechanism and incloses the gearing and clutches comprises an upper shell 1 connected to a lower shell 2 by means of vertical bolts 3.

4 designates the usual driving shaft of the engine rotatably mounted in the lower shell 2.

5 designates a counter shaft parallel with the shaft 4 and rotatably mounted at its ends in the shell 2.

6 designates a horizontal driven or jack shaft, preferably disposed in longitudinal alinement with the driving shaft 4 and rotatably mounted at one end in the lower shell 2, and rotatably mounted at its other end in one member 7 of a clutch, said member 7 being keyed to the driving shaft 4. The other member 8 of said clutch is keyed to the driven shaft 6 on which it is longitudinally slidable. The clutch members 7 and 8 may be frictionally engaged in any usual manner. In the drawings, I have shown alternating friction disks 9 and 10 encircling the member 8 in the member 7 and adapted to be clamped together by the members 7 and 8 when the member 8 is slid to the locking position. In the drawings, Fig. 3, the disks 9 and 10 are shown unlocked.

When the member 8 is slid into locked position, as will be hereinafter described, the driving shaft 4 is locked to the driven shaft 6 for high speed transmission ahead, the driven shaft 6 being connected in the usual manner to the differential mechanism of the automobile, not shown.

For continuously rotating the counter shaft 5, it has keyed to it a gear 11 which is always in mesh with a gear 12, which is, preferably, integral with the clutch member 7.

For rotating the driven shaft 6 at middle speed, it has secured to it a clutch member 13, which is slidable on the shaft 6, and which is adapted to be locked to a clutch member 14 revoluble on the shaft 6 by alternating friction disks 9 and 10 arranged with relation to the members 13 and 14 as are the disks 9 and 10 to the members 7 and 8.

Integral with the member 14 is a gear 15 which meshes with a gear 16 keyed to the shaft 5. The clutch member 14 is constantly rotating on the shaft 6, through the intermediacy of the gears 15 and 16 which are constantly in mesh. When the clutch member 13 is slid into the locking position, as will be described, the shaft 6 is rotated at middle speed straight ahead.

A plate 17 secured to the shell 2 extends between the gear 15 and the member 14 and holds the latter from sliding on the shaft 6.

For rotating the driven shaft 6 at low speed, it has keyed to it a gear 18 which meshes with a gear 19, which is rotatable on the counter shaft 5 and is, preferably, integral with a clutch member 20 revoluble on the shaft 5 and adapted to be locked to a clutch member 21, keyed to the shaft 5 and slidable thereon, by means of alternating friction disks 22 and 23 encircling the member 21 and located within the member 20, and corresponding in function and mode of operation to the disks 9 and 10. When the clutch member 21 is slid to the locking position, the driven shaft 6 will be rotated ahead at low speed.

For reversing rotation of the driven shaft 6, it has secured to it a gear 24, which meshes with a gear 25, which is revoluble on the shaft 5. The gear 24 is keyed to the shaft 6.

The gear 25 is, preferably, integral with a clutch member 26, which is revoluble on the shaft 5 and is adapted to be locked to a clutch member 29, revoluble on the shaft 5 by means of friction disks 27 and 28, corresponding to the disks 9 and 10 and encircling the member 29 within the member 26.

Keyed or otherwise secured to the clutch member 29 is a gear 30, which meshes with a gear 31, Figs. 2 and 3, which is rotatable on a shaft 32, which is parallel with the driving shaft 4. Secured to the gear 31 and rotatable on the shaft 32 is a gear wheel 33, which meshes with the gear wheel 12.

When the clutch member 29 is slid to the locking position on the shaft 5, the driven shaft 6 will be reversed through the intermediacy of the gears 12, 33, 31 and 30, clutch members 29 and 26, disks 27 and 28, and gears 25 and 24.

For holding the clutch members 20 and 26 from sliding, a U-shaped bracket 34 secured to the shell 2 has one arm disposed between the clutch member 20 and the gear 19, the other arm being disposed between the gear 25 and the clutch member 26.

For holding the gear 30, in which the clutch member is slidable, from sliding movement, a U-shaped bracket 35 secured to the shell 2 has its arms embracing opposite sides of the gear 30.

For sliding the clutch members 8, 13, 21 and 29, there are respectively rotatably mounted on said members rings 36, 27, 38 and 39, which are respectively held from longitudinal movement on said clutch members by rings 40, 41, 42, and 43, secured respectively to said clutch members.

An upright lever 44, Fig. 1, is pivoted by a transverse pin 45 and intermediate of its ends to a bracket 46 depending from the shell 1, the lower end of the lever 44 is bifurcated and pivotally engages diametrically opposite projections 47 on the ring 36. The upper end of the lever 44 is pivoted to one end of a member 48, which is provided with a horizontal stem 49, Fig. 2, which is longitudinally slidable in a bracket 50, which depends from the top of the shell 1.

Encircling the stem 49 is a coil spring 51, Fig. 2, which bears at one end against the member 48 and at its other end against the bracket 50. The spring 51 normally forces the member 48 to the neutral position shown in Fig. 2, and the member 48 through the lever 44 forces the clutch member 8 to the neutral position shown in Fig. 3.

For sliding the clutch member 13, there is provided an upright lever 52, having a bifurcated upper end, the arms of which are pivoted to a horizontal pin 53, Figs. 1 and 2, which is supported in two depending lugs 54 on the under side of the top of the shell 1. The lower end of the lever 52 is bifurcated and has its arms pivoted respectively to two diametrically opposite projections 55, on the ring 37, Figs. 1 and 3.

The lever 52 intermediate of its ends is pivoted by a transverse pin 56, to a member 57, which is provided with a horizontal stem 58, which is horizontally slidable in a bracket 59 depending from the top of the shell 1, Figs. 1 and 2. Encircling the stem 58 is a coil spring 60, which at one end bears against the bracket 59 and which at its other end bears against a nut 61, mounted on the stem 58, Fig. 2.

The spring 60 normally forces the member 57 to the neutral position shown in Fig. 2, thereby, by means of the lever 52, forcing the clutch member 13 to the neutral position shown in Figs. 1 and 3.

For sliding the clutch member 21 on the shaft 5, there is provided an upright lever 62, having a bifurcated lower end, the arms of which are respectively pivoted to two diametrically opposite projections 63 on the ring 38, Figs. 1, 2 and 3. The upper end of the lever 62 is bifurcated and has its arms pivoted by means of a transverse pin 64 to one end of a horizontal member 65, Figs. 1 and 2. The lever 62 intermediate of its ends is pivoted by means of a transverse pin 66 to a bracket 67, secured to the shell 1.

A horizontal pin 68, Fig. 1, is secured at one end to a depending lug 69 on the member 65. The pin 68 is longitudinally slidable in a hole provided in the bracket 67.

A coil spring 71 encircles the pin 68 and bears at one end against the bracket 67 and at its other end against the lug 69. The spring 71 normally forces the member 65 to the neutral position shown in Figs. 1 and 2, thereby by means of the lever 62 forcing the clutch member 21 to the neutral position shown in Figs. 1 and 2, and also in Fig. 3.

For sliding the clutch member 29, there is provided an upright lever 72, the lower end of which is bifurcated and pivoted to two diametrically opposite projections 73 on the ring 39. The upper end of the lever 72 is bifurcated and is pivoted to the adjacent end of the member 65 by a transverse pin 74. The lever 72 intermediate of its ends is pivoted by means of a transverse pin 75 to a bracket 76 which depends from the under side of the shell 1.

The member 65 is provided with a depending lug 77, to which is secured one end of a horizontal pin 78, which is slidably mounted in a hole 79, in the bracket 76.

A coil spring 80 encircles the pin 78 and bears at one end against the lug 77 and at its other end against the bracket 76. The spring 80 normally serves to force the member 65 to the neutral position shown in Figs. 1 and 2, thereby forcing the clutch member 29, through the intermediacy of the lever 72 to the neutral position shown in Figs. 1, 2 and 3.

The member 65 in swinging simultaneously swings the levers 62 and 72 so as to simultaneously move the clutch member 21 to the locking position and the clutch member 29 to the unlocking position, and vice versa. The coil spring 71 moves the member 65 to the neutral position from one locking position and the spring 80 serves to move said member to the neutral position from the other locking position.

For manually sliding the members 48 and 57 from the neutral to the locking positions, and for sliding the member 65 from the neutral to the two locking positions which may be assumed by the member 65, I provide a manually operable upright lever 81, which is transversely slidable on a horizontally transverse pin 82 which has its ends mounted in two upright legs 83 of a quadrant casting, the legs being secured by means of bolts 84 to the top of the shell 1.

The upper side of the quadrant casting is provided with an arcuate toothed top 85, which is supported by the legs 83 and the function of which will be hereinafter described.

The lever 81 extends downwardly through a slot 86, in the top of the shell 1 and is provided at its lower end with an ellipsoidal knob 87, which is adapted to be slid consecutively into three grooves 88, 89 and 90, provided respectively in the upper sides of the members 48, 57, and 65.

In order that the operating lever 81 may be slid, when in the upright position, shown in the drawings, to positions in which the knob 87 of the lever may consecutively engage the slotted portions of the members 65, 57 and 48, the arcuate top 85 of the quadrant casting is provided with a transverse slot 91, Figs. 5 and 6.

To permit the lever 81 to be swung on the pin 82, when the knob 87 is engaged with the member 65, the top 85 is provided with a slot 92 extending across and at right angles to the slot 91.

To permit the lever 81 to be swung on the pin 82, when the knob 87 is engaged with the plate 57, there is provided in the top 85 a slot 93 which extends laterally to the left from the slot 92, as viewed in Fig. 5.

To permit the lever 81 being swung on the pin 82, when the knob 87 is engaged with the member 48, the top 85 is provided with a slot 94 which extends laterally from the slot 92 to the left as viewed in Fig. 5.

For locking the lever 81 releasably to the top 85 when the lever is in any position to which it may be moved, said lever 81 has longitudinally slidable on it a locking block or pawl 95 having an arcuate toothed under side which is adapted to lockingly engage a series of transverse teeth 96 which are disposed parallel with the pin 82 in the upper side of the top 85.

For lifting the pawl 95 out of engagement with the teeth 96 by hand, the pawl 95 is provided on its upper side with two lugs 97, Fig. 4, through which extends a transverse pin 98, which also extends through a longitudinal slot 99 in the lever 81.

Two bars 100 are pivoted at their lower ends to the pin 98, and at their upper ends they are pivoted to a bell crank lever 101, which is pivoted in the usual manner to the lever 81, near the upper end thereof.

By properly swinging the bell crank lever 101, the pawl 95 is lifted and disengaged from the teeth 96 so as to permit the lever 81 to be slid, when in the vertical position, on the pin 82 opposite either one of the slots 92, 93 or 94. When the lever 81 is opposite the slot 92, and the pawl 95 is disengaged from the teeth 96, the lever 81 may have its upper end swung to the left, that is, forwardly, as viewed in Figs. 1, 5 and 6. At this time, the knob 87 will be in the slot 90 of the member 65, and the latter will be moved to the right, as viewed in Fig. 1, thereby compressing the spring 71 and, through the intermediacy of the lever 62 forcing the clutch member 21 into the clamping position with relation to the clutch member 20, whereupon the clutch member 20 will be rotated and will drive the shaft 6 at low speed through the intermediacy of the gears 19 and 18.

To reverse the shaft 6, the upper end of the lever 81 is swung to the right, as viewed in Fig. 1, thereby moving the member 65 to the left, thus compressing the spring 80 and, through the intermediacy of the lever 72, forcing the clutch member 29, which is constantly revolving, into the clamping position relatively to the clutch member 26, which will now revolve and will reverse the shaft 6 by means of the gears 25 and 24.

To drive the shaft 6 straight ahead at middle speed, the lever 81, when in the vertical position is slid on the pin 82 to a position opposite the slot 93, after which the pawl 95 is lifted and the upper end of the lever 81 is swung to the left, as viewed in Fig. 1, thereby causing the knob 87, which is in the slot 89, to slide the member 57 to the right, as viewed in Fig. 1, thereby compressing the spring 60 and, through the intermediacy of the lever 52 forcing the clutch member 13 to the right and in the clamping position with relation to the clutch member 14. The latter is constantly revolving and will rotate the shaft 6 at middle speed by means of the clutch member 13.

To rotate the shaft 6 at high speed ahead, the lever 81, when in the vertical position, is slid on the pin 82 to a position opposite the slot 94 and with the knob 87 in the slot 88. If now the pawl 95 is disengaged from the teeth 96 in the upper end of the lever 81, swung forwardly, that is to the left, as viewed in Fig. 1, the spring 51 will be compressed and the clutch member 8 will be slid to the clamping position relatively to the clutch member 7 through the intermediacy of the lever 44, thus locking the driving shaft 4 to the shaft 6 so that the latter is rotated at the speed of the driving shaft.

It will be understood that when the lever 81 is moved to any position in which it is to be locked, the lever 101 is released, thus permitting the pawl 95 to drop by gravity into locked engagement with the teeth 96.

The springs 51, 60, 71 and 80 automatically swing the lever 81 in the neutral upright position, when the pawl 95 is released from the teeth 96.

In order that the lever 81 may be released so as to swing automatically to the neutral position, without the operator having to swing the lever 101 by hand, and thereby permitting the operator to have both hands free to operate the steering wheel, I provide a foot lever 102, which extends downwardly through a slot 103 in the top of the shell 1, and which is pivoted on the pin 53. The lower end of the lever 102 is bifurcated and has its two arms respectively pivoted to the lower ends of two upright bars 104, the upper ends of which are respectively pivoted to the free ends of two bars 105 by means of a horizontal pin 106, which is rigidly secured to the bars 105 which is provided with two arms 107, Fig. 5, and Fig. 6, which extend into the slot 93 below the transverse path of movement of the pawl 95. The other ends of the bars 105 are pivoted on a transverse pin 108, which is mounted in the legs 83.

When the lever 81 is in the slot 92, the pawl 95 is above the adjacent bar 105 and is adapted to be lifted thereby out of engagement with the teeth 96, when the right end of the lever 102, as viewed in Figs. 1, 5, 6 and 7, is depressed to the proper position by the foot of the operator. When the lever 102 is so depressed, it will lift the left ends of the bars 105 by means of the pin 106 and the upright bars 104.

When the lever 81 is opposite the slot 93, and the right end of the foot lever 102 is depressed, the arms 107 will engage and lift the pawl 95 out of engagement with the teeth 96.

When the lever 81 is opposite the slot 94, and the lever 102 is depressed, as described, the adjacent bar 105 will be lifted and will engage and lift the pawl 95 out of engagement with the teeth 96.

From the foregoing description, it will be understood that when the driving shaft 4 is driven by the engine, the driven shaft 6 may be rotated straight ahead at low, middle or high speed, when the lever 81 is opposite the slots 92, 93, or 94 respectively, and the upper end of the lever 81 is swung forwardly, that is to the left as viewed in Figs. 5, 6 and 7. When the driven shaft 6 is to be reversed, and the lever is opposite the slot 92, the upper end of the lever 81 is swung rearwardly, that is to right, as viewed in Figs. 5, 6 and 7. Thus with my invention, the manually operated controlling lever 81 is always swung at its upper end, which is the end which is grasped by the hand of the operator, in the direction the automobile is to be driven, that is forwardly for going ahead at any speed and rearwardly for reversing. With this arrangement, the operator is not liable to become confused as to the direction he should swing the operating lever 81, as might be the case if it were necessary to swing the operating lever forwardly for some speeds ahead and rearwardly for another speed ahead.

With my invention, the gearing is always in mesh, thus avoiding liability of stripping the gear teeth, as often occurs in constructions of this character in which the gears are engaged and disengaged to change the speed or to reverse.

If desired, the shafts 5 and 6 between the gears 19 and 25 and 18 and 24 may be respectively supported by means of bearings 109 and 110 mounted upon the bottom of the shell 2, see Figs. 1, 3 and 4.

I do not limit my invention to the structure shown and described, as various modifications, within the scope of the appended claims, may be made without departing from the spirit of my invention.

What I claim is:—

1. In change speed transmission, a driving shaft, a driven shaft, a counter shaft, a manually movable operating member, gearing connecting the driving shaft with the counter shaft for rotating the latter in one direction at one rate of speed, means including a clutch connecting the counter shaft and the driven shaft for rotating the latter in one direction at one rate of speed, means including a clutch connecting the counter shaft and the driven shaft for rotating the latter at a higher rate of speed and in the same direction, means including a clutch for connecting the driving shaft and the driven shaft for rotating the latter in the same direction and at a still higher rate of speed, means including a clutch connecting the driving shaft and the driven shaft for reversing the direction of rotation of the latter, and means by which the operating member may selectively actuate said clutches respectively and arranged so that the operating member is moved in one direction for effecting rotation of the driven shaft at any of said rates of speed and in the opposite direction for reversing rotation of the driven shaft.

2. In change speed transmission, a driving shaft, a driven shaft, a counter shaft, a manually movable operating member, gearing connecting the driving shaft and the counter shaft for continuously rotating the counter shaft, two gears and a clutch for connecting the counter shaft and the driven shaft, one gear being revoluble with the driven shaft and the other gear being revoluble on the counter shaft, the gears meshing with each other, two gears meshing with each other, one secured to and revoluble with the countershaft and the other revoluble on the driven shaft, a clutch connecting the last named gear and the driven shaft, a clutch for connecting the driven shaft and the driving shaft, the said gearing, gears and clutches being arranged to transmit rotation in one direction at three rates of speed from the driving shaft to the driven shaft, driving means including a clutch connecting the driving shaft and the driven shaft for reversing the direction of rotation of the latter, and means by which said operating member may selectively actuate said clutches and arranged so that when the operating member is moved in one direction to three operative positions respectively it will respectively place the first three clutches in the clamping positions, and when moved in the opposite direction to a fourth operative position, it will place the last named clutch in the clamping position.

In testimony whereof I have signed my name to this specification.

SWENEY MUNSON.